(12) United States Patent
Schümann et al.

(10) Patent No.: US 8,268,922 B2
(45) Date of Patent: Sep. 18, 2012

(54) PRESSURE-SENSITIVE ADHESIVE FROM A RESIN-MODIFIED POLYURETHENE

(75) Inventors: Uwe Schümann, Pinneberg (DE); Kirstin Weiland, Hamburg (DE); Bodo Zu Putlitz, Hamburg (DE)

(73) Assignee: tesa SE, Hamburg (DE)

( * ) Notice: Subject to any disclaimer, the term of this patent is extended or adjusted under 35 U.S.C. 154(b) by 725 days.

(21) Appl. No.: 12/374,071

(22) PCT Filed: Jun. 27, 2007

(86) PCT No.: PCT/EP2007/056398
§ 371 (c)(1),
(2), (4) Date: Mar. 18, 2009

(87) PCT Pub. No.: WO2008/009542
PCT Pub. Date: Jan. 24, 2008

(65) Prior Publication Data
US 2010/0132885 A1    Jun. 3, 2010

(30) Foreign Application Priority Data

Jul. 19, 2006   (DE) .......................... 10 2006 033 796

(51) Int. Cl.
| | |
|---|---|
| A41G 1/00 | (2006.01) |
| B32B 27/00 | (2006.01) |
| B32B 27/40 | (2006.01) |
| C04B 37/00 | (2006.01) |
| C08F 8/30 | (2006.01) |
| C08F 283/04 | (2006.01) |
| C08G 18/08 | (2006.01) |
| C08G 18/28 | (2006.01) |
| C08L 75/00 | (2006.01) |
| C09J 4/00 | (2006.01) |
| C09J 101/00 | (2006.01) |
| C09J 201/00 | (2006.01) |

(52) U.S. Cl. ....... 524/507; 156/61; 156/325; 156/330.9; 156/331.4; 156/331.7; 428/423.1; 524/589; 524/590; 525/123; 525/455

(58) Field of Classification Search ................... 524/507, 524/589, 590; 525/123, 455; 428/423.1, 428/425.1, 425.8; 156/61, 325, 330.9, 331.4, 156/331.7
See application file for complete search history.

(56) References Cited

U.S. PATENT DOCUMENTS

| | | | |
|---|---|---|---|
| 3,246,049 | A | 4/1966 | Webber |
| 3,437,622 | A | 4/1969 | Dahl |
| 3,718,712 | A | 2/1973 | Tushaus |
| 3,743,616 | A | 7/1973 | Kest |
| 1,425,500 | A | 2/1976 | Adsley et al. |
| 6,133,398 | A | 10/2000 | Bhat et al. |
| 2004/0265529 | A1 | 12/2004 | Luhmann et al. |
| 2005/0019560 | A1 | 1/2005 | Hesse et al. |

FOREIGN PATENT DOCUMENTS

| | | |
|---|---|---|
| DE | 1904102 | 8/1970 |
| DE | 2139640 | 2/1973 |
| DE | 2435217 | 2/1975 |
| DE | 2435218 | 2/1975 |
| DE | 4233289 | 4/1994 |
| DE | 19840786 | 1/2000 |
| DE | 10030908 | 2/2001 |
| DE | 10317788 | 2/2004 |
| DE | 10317790 | 4/2004 |
| EP | 0081103 | 6/1983 |
| EP | 0196749 | 10/1986 |
| EP | 0597636 | 10/1986 |
| EP | 0882749 | 12/1998 |
| EP | 0979835 | 2/2000 |
| EP | 1088871 | 4/2001 |
| EP | 1095993 | 5/2001 |
| EP | 1101807 | 5/2001 |
| EP | 1108768 | 6/2001 |
| GB | 1113925 | 5/1968 |
| GB | 1216672 | 12/1970 |
| JP | 59227922 | 12/1984 |
| JP | 59230076 | 12/1984 |
| JP | 63189486 | 8/1988 |
| JP | 63260977 | 10/1988 |
| JP | 1156386 | 10/1989 |
| JP | 2003476 | 1/1990 |
| JP | 000073040 | 3/2000 |
| JP | 2000256638 | 9/2000 |
| JP | 2000256639 | 9/2000 |
| JP | 2001146577 | 5/2001 |
| JP | 2000328034 | 1/2009 |
| WO | 9407935 | 4/1994 |

(Continued)

OTHER PUBLICATIONS

Ullmanns Encyklopadie der technischen Chemie; Antimon ud Antimon-Verbindungen bis Brot und andere Backwaren; Band 8; 1974; pp. 20-21.
Ullmanns Encyklopadie der technischen Chemie; Korrosion bis Lacke; Band 15; 1978; pp. 528-530.
Kirk-Othmer; UV Stablizers; vol. 23; pp. 615-627.
Stabilisatoren, et al; Taschenbuch der Kunststoff-Additive;Verlag Munchen Wien; 1979; pp. 91-143.
Encyclopedia of Polymer Science and Techology: Plastics, Resins, Rubbers, Fibers; vol. 14; 1979; pp. 125-148.

*Primary Examiner* — Patrick Niland

(74) *Attorney, Agent, or Firm* — Norris McLaughlin & Marcus PA

(57) ABSTRACT

Pressure-sensitive adhesive based on a mixture of chemically crosslinked polyurethane and at least one hydrocarbon resin, the chemically crosslinked polyurethane being a reaction product of at least one aliphatic or alicyclic polyisocyanate and a combination of at least one polypropylene glycol diol and one polypropylene glycol triol, reacted with one another catalytically in the presence of the at least one hydrocarbon resin, the at least one hydrocarbon resin being a monomer resin of the styrene/α-methylstyrene type.

13 Claims, No Drawings

FOREIGN PATENT DOCUMENTS

| | | |
|---|---|---|
| WO | 9722642 | 6/1997 |
| WO | 9725360 | 7/1997 |
| WO | 9830648 | 7/1998 |
| WO | 9831760 | 7/1998 |
| WO | 9951657 | 10/1999 |
| WO | 9951661 | 10/1999 |
| WO | 9959719 | 11/1999 |
| WO | 9964152 | 12/1999 |
| WO | 9964493 | 12/1999 |
| WO | 0162818 | 8/2001 |
| WO | 0212365 | 2/2002 |

PRESSURE-SENSITIVE ADHESIVE FROM A RESIN-MODIFIED POLYURETHENE

This is a 371 of PCT/EP2007/056398 filed 27 Jun. 2007 (international filing date).

The invention relates to pressure-sensitive adhesives (PSAs) that are based on a mixture of a chemically crosslinked polyurethane and at least one hydrocarbon resin, and that, in one preferred embodiment, that allow paper, paperboard or other light- to medium-weight articles of everyday use to be bonded reliably to themselves or to other substrates and to be detached again without residue, very largely without damaging the paper, paperboard, articles or substrates during detachment or without leaving greasy-looking spots, and which, in particular, is transparent, stable to light, can be used more than once, and is washable. The invention also relates to pressure-sensitive adhesives based on a mixture of a chemically crosslinked polyurethane and at least one hydrocarbon resin that, in a further preferred embodiment, allow light- to medium-weight articles to be bonded durably to themselves or to other substrates, even under high shearing loads, and relates to a reactive coating process for their solvent-free and water-free, continuous preparation, and also relates to the use of the PSAs for producing self-adhesive articles, such as adhesive tapes, films, strips, sheets or pads, for example.

BACKGROUND OF THE INVENTION

Pressure-sensitive adhesion properties or intrinsic adhesion properties are not typical of polyurethanes. Although polyurethanes occupy position five in the ranking list of plastics in terms of the quantities produced, PSAs of this material play only a very minor role economically.

Nevertheless, polyurethane PSAs have been known for a long time and are described diversely. It has likewise long been known that the effect of pressure-sensitive adhesiveness can be obtained by adding tackifier resins and/or plasticizers to the polyurethane base polymer.

This method is described in, for example, U.S. Pat. No. 3,437,622 A (Dahl et al., Continental Tapes), U.S. Pat. No. 3,718,712 A (Tushaus et al., 3M), U.S. Pat. No. 4,087,392 A (Hartmann et al., BASF), DE 19 04 102 A (Hagenweiler, BASF), and JP 2000 256 639 (Toyo).

The pressure-sensitive adhesives described to date in this way have the disadvantage, on the one hand, of exhibiting strong peel increase on the majority of substrates, especially on paper or paperboard, when bonded for a prolonged period, and hence of being impossible to detach again without damage, and, on the other hand, of yielding even under slight shearing loads, with the consequence of rapid, cohesive failure of the bond.

The term "peel increase" is understood by a person skilled in the art to describe the increase in bond strength of the adhesive bond during storage.

It is also possible for the tackifier resin to migrate into the substrate, where it leaves greasy-looking spots. In addition, the resin-containing pressure-sensitive adhesives described to date that are based on polyurethane are not transparent.

The highly disruptive phenomenon of the PSA, following its redetachment from paper, paperboard, wallpaper or similar materials, leaving behind "grease spots" is observed not least for those polyurethane-based PSAs where the pressure-sensitive adhesiveness is obtained by undercrosslinking: i.e. an amount of isocyanate groups in deficit to the isocyanate-reactive groups, such as hydroxyl or amino groups, for example.

PSAs designed on the principle of undercrosslinking are described in, for example, U.S. Pat. No. 5,157,101 A (Orr, Norwood), DE 24 35 218 A (Adsley et al., Adhesive Tapes), JP 59 227 922 A1 (Sanyo), U.S. Pat. No. 3,930,102 A (Szonn et al., Beiersdorf), U.S. Pat. No. 5,714,543 A (Kydonieus et al., Bristol Myers Squibb), EP 0 597 636 A1 (Kydonieus et al., Squibb) and U.S. Pat. No. 5,591,820 A (Kydonieus et al., Squibb).

Polyurethane PSAs containing monools fall into a very similar category with analogous weaknesses. Polyurethanes of this kind are likewise undercrosslinked and therefore contain relatively large fractions of migratable polyurethane units of low molecular weight.

Polyurethane PSAs on this basis are known from, for example, EP 0 882 749 A1 (Ikeda et al., Nitto), U.S. Pat. No. 5,227,409 A (Mobley et al., Dow) and U.S. Pat. No. 5,102,714 A (Mobley et al., Dow).

Another type of polyurethane PSAs uses polyol components which carry hydroxyl groups and contain double bonds. Polyurethane PSAs on this basis are set out in, for example, JP 02 003 476 A1 (Tsubota et al., Shinko), WO 98/30648 A1 (Gerard et al., Shell), JP 59 230 076 A1 (Sekisui), JP 2001 146 577 A1 (Toyo), U.S. Pat. No. 3,879,248 A (Kest), U.S. Pat. No. 3,743,616 A (Kest), U.S. Pat. No. 3,743,617 A (Kest), U.S. Pat. No. 5,486,570 A (St. Clair, Shell) and U.S. Pat. No. 3,515,773 A (Dahl et al., Continental Tapes). A drawback is the oxidative sensitivity of these PSAs, caused by the double bonds in the polymer main chain.

After a certain time this leads to filming or to "blunting" of the pressure-sensitively adhesive surface. In addition, the majority of PSAs of this type further contain resins, with the disadvantages already described earlier on above.

A special polyurethane PSA containing carbon-carbon double bonds and based on castor oil, a natural product, is described in U.S. Pat. No. 3,246,049 A (Webber, Norton). Here again, the oxidative sensitivity is to be regarded as a weakness.

EP 0 979 835 A (Questel et al., Elf Atochem) proposes hydroxyl-terminated polyalkylenes as a polyol component, which would solve the problem of oxidative activity. The compositions, however, are moisture-curing, consequently attain a high ultimate cohesive strength and cannot be used more than once, so that they are unsuitable for reversible adhesive bonding paper. They, further contain tackifier resins and plasticizers, whose disadvantages have already been described earlier on above.

Moisture-curing polyurethane PSAs are also described in, for example, U.S. Pat. No. 4,661,542 A (USM), JP 63 189 486 A1 (Sanyo) and EP 0 196 749 A1 (von Voithenberg et al., Emhart).

A polyurethane PSA based on hydrogenated polybutadienes is described in JP 01 156 386 A1 (Uehara et al., Hitachi). A drawback there is the need for electron beam crosslinking, which involves a considerable level of technical complexity.

A polyurethane PSA likewise requiring electron beam curing is known from JP 63 260 977 A1 (Uehara et al., Hitachi). It uses polyethers as polyol component.

Certain publications describe polyurethane-including blends or polyurethane copolymers having pressure-sensitive adhesive properties. Examples include U.S. Pat. No. 5,910, 536 A (Kydonieus et al., Bristol Myers Squibb), U.S. Pat. No. 5,714,543 A (Shah et al., Bristol Myers Squibb) and U.S. Pat. No. 4,626,475 A (Barnett et al., Ashland Oil). These PSAs generally feature a heightened tack and are therefore difficult to remove from paper and other sensitive substrates without damaging them.

Polyurethane PSAs having special additional properties, such as flame retardancy or electrical conductivity, for example, are described in, for example, EP 1 108 768 A1 (Wong, Tyco) or U.S. Pat. No. 4,855,077 A (Hata et al., Takiron).

Foamed polyurethanes having pressure-sensitive adhesion properties are likewise known. An example that may be mentioned is the publication DE 24 35 217 A (Adsley et al., Adhesive Tapes), and also the descriptions of hydrophilic foams in DE 42 33 289 A (Kenndoff et al., Beiersdorf) and WO 94/07935 A (Kenndoff et al., Beiersdorf).

In principle, as a result of the enlargement of the surface area, foamed polyurethanes have the drawback of a heightened oxidative sensitivity and also a heightened light sensitivity. In practice it has been found that they exhibit strong peel increase on paper and paperboard when bonded for a prolonged period and either cannot be removed without damaging the paper or paperboard or else, particularly in the case of foams made hydrophilic by additions of superabsorbent, interact with the paper or paperboard in such a way that spotting occurs.

Polyurethanes having pressure-sensitive adhesive properties can also be obtained, as demonstrated in JP 2000 073 040 A1 (Toyo) and JP 2000 256 638 A1 (Toyo), by using not only polyethers but also polyesters and also two different catalysts within a polyol component formula. A particular drawback in this case is the increased preparation complexity resulting from the formulas.

JP 2000 328 034 A1 (Toyo), U.S. Pat. No. 3,761,307 A (Dahl) and U.S. Pat. No. 3,925,283 A (Dahl, Continental Tapes) describe pressure-sensitive adhesive polyurethane/ureas which are obtained by incorporating additional amine-type chain extenders or crosslinkers into the polymer. Drawbacks perceived are the complexity in preparation and the presumed excessive peel increase on paper.

DE 21 39 640 A (Dollhausen et al., Bayer) describes a PSA based on an aromatic diisocyanatourethane. A particular drawback is the yellowing tendency, which is typical of aromatic polyurethanes.

In order to achieve pressure-sensitive adhesion properties DE 100 30 908 A1 (Bolte et al., Henkel) and EP 0 081 103 A1 (Miyake et al., Takeda) propose using two different isocyanates within a polyurethane composition. In these cases too the complexity in preparation is perceived to be a drawback.

WO 97/22642 A1 (Chang et al., Bristol Myers Squibb) proposes, for the preparation of a PSA, heating an NCO-terminated prepolymer and a polyhydroxy compound together at a certain temperature until a gel fraction of 30 to 40% is obtained. A disadvantage of this method is the grease strikethrough tendency when the PSA is used to bond paper, this tendency being a result of the relatively low gel content.

U.S. Pat. No. 3,796,678 A (Bartizal, 3M) discloses a polyurethane PSA based on capped isocyanate prepolymers which relies on water or organic solvents for its preparation. The complex nature of the preparation is regarded as a drawback, along with the unavoidable need to use water or solvents.

A polyurethane latex PSA is described in WO 98/31760 A1 (Schrock et al., Dow Chemical). A drawback is the need for drying, which makes it either impossible or at least very time-consuming to obtain blister-free, relatively thick PSA films.

Certain publications define a polyurethane PSA by way of the crosslinking density. GB 1,113,925 A (Weller) and GB 1,216,672 A (Grindley) propose chain lengths of from 130 to 285 chain atoms and, respectively, more than 285 chain atoms between the crosslinking points. In practice it has been shown that controlling the PSA properties by way of the criterion of chain length alone is an impossibility. An insufficient crosslinking density results in the known problem of grease strikethrough in the case of adhesive bonds on paper, while too high a crosslinking density leads to PSAs whose intrinsic adhesiveness is inadequate.

EP 1 088 871 A1 (Heguri et al., Sekisui) prescribes a certain distance between the isocyanate groups, or a certain degree of crosslinking, for the polyisocyanate used. The molecular weight between two isocyanate groups within the polyisocyanate is intended to amount to from 220 to 570. This way of controlling the crosslinking density by way of the chain length within the polyisocyanate is likewise unlikely to mitigate the known problem either that the bond strength is inadequate, particularly for bonds on paper, or otherwise that a tendency is observed for grease spots to be formed.

U.S. Pat. No. 6,040,028 A (Cline et al., Bayer) also defines a polyurethane adhesive (contact adhesive) by way of the molecular weight between crosslinking points. A molecular weight of between 7000 and 16000 is prescribed. Further restrictions are imposed, to the effect, inter alia, that from 0 to 10% of the polyols must have a molecular weight of from 60 to 400 and from 90 to 100% of the polyols must have a molecular weight of from 1800 to 12000.

Here again it must be assumed that the grease strikethrough tendency typical of PSA polyurethanes will occur, since the crosslinking density is relatively low and no indications are given of a possible solution to the problem.

WO 01/62818 A1 (Hansen et al., 3M) proposes reacting isocyanates with two polyols or other materials which react with NCO groups for the purpose of preparing a polyurethane PSA, the components which react with the isocyanates differing from one another in that one has a molecular weight of more than 2000 and one has a molecular weight of less than 2000.

PSAs of this kind are known, inter alia, from the examples in U.S. Pat. No. 5,227,409 A and U.S. Pat. No. 3,437,622 A, which also includes the restriction (according to dependent claim 5) whereby the components which react with the isocyanates are almost exclusively diols. Additionally, polyurethanes with such a composition have already been described in the examples in EP 1 095 993 A1 and EP 1 101 807 A1, the last-mentioned examples not relating to compositions for obtaining PSAs. The proposed reaction product in WO 01/62818 A1 is therefore not definitely a PSA. There are no references to solving the grease strikethrough problem. Nor are there any references to achieving transparency.

SUMMARY OF THE INVENTION

It is an object of the invention to provide an improved pressure-sensitive adhesive which does not exhibit, or not to the same extent, the outlined disadvantages of the prior art.

It is a further object of the invention to provide a pressure-sensitive adhesive with which paper, paperboard or other lightweight articles of everyday use can be bonded reliably to themselves or other substrates and can be detached again without residue without the paper, paperboard, articles or substrates being damaged during detachment, which in particular is transparent, stable to light, can be used more than once and is washable. In particular the PSA, following removal, ought not to leave any greasy-looking spots on the paper, paperboard, articles or substrate.

It is an object of the invention, furthermore, to provide a pressure-sensitive adhesive that allows light- to medium-weight articles to be bonded durably to themselves or to other substrates even under high shearing loads.

These objects are achieved by means of a pressure-sensitive adhesive based on a mixture of a chemically crosslinked polyurethane and at least one hydrocarbon resin.

Accordingly the invention provides a pressure-sensitive adhesive based on a mixture of a chemically crosslinked polyurethane and at least one hydrocarbon resin, the chemically crosslinked polyurethane being composed of the following starting materials which in the stated proportions are reacted with one another catalytically in the presence of the hydrocarbon resin or hydrocarbon resins:
a) at least one aliphatic or alicyclic polyisocyanate whose functionality is in each case less than or equal to three, preferably two,
b) a combination of at least one polypropylene glycol diol and one polypropylene glycol triol, the ratio of the number of isocyanate groups to the total number of hydroxyl groups being between 0.8 and 1.15, preferably between 0.95 and 1.05, and the ratio of the number of hydroxyl groups in the diol component to the number of hydroxyl groups in the triol component being between 0.8 and 9.0, preferably between 1.0 and 4.0,
and the diols and triols alternatively being selected and combined in each case as follows:
  diols having a mean, number-averaged molecular weight $M_n$ of less than or equal to 1000 are combined with triols whose mean, number-averaged molecular weight $M_n$ is greater than or equal to 1000, preferably greater than or equal to 3000,
  diols having a mean, number-averaged molecular weight of greater than 1000 are combined with triols whose mean, number-averaged molecular weight is less than 1000.

It is essential for the invention that at least one hydrocarbon resin is a monomer resin of the styrene/α-methylstyrene type having a mean, number-averaged molecular weight $M_n$ of between 200 and 6000, preferably between 500 and 2000, the weight fraction of the resin in the mixture being greater than 0% and ranging up to a maximum of 55% inclusive.

DETAILED DESCRIPTION

In one advantageous embodiment of the invention the weight fraction of the resin in the mixture is greater than 0% and ranges up to 30%.

In a further advantageous embodiment of the invention the weight fraction of the resin in the mixture is greater than/equal to 30% and ranges up to a maximum of 55% inclusive.

In order to produce polyurethanes having sufficient light stability it is necessary, as is known, to use aliphatic or alicyclic polyisocyanates or polyisocyanates containing isocyanate groups which are not attached aromatically. Surprisingly it has been found that aliphatic or alicyclic polyisocyanates are suitable in order also to generate the other desired profile of properties of the polyurethane PSAs in accordance with the object of the invention. In particular, the high transparency in association with the good adhesive properties can be brought about through the use of aliphatic or alicyclic polyisocyanates.

One advantageous embodiment uses aliphatic or alicyclic diisocyanates. Particularly advantageous is the use of aliphatic or alicyclic diisocyanates having in each case an asymmetrical molecular structure, in which, in other words, the two isocyanate groups each possess a different reactivity. In particular, the tendency otherwise typical of pressure-sensitively adhesive polyurethanes, namely that of leaving greasy-looking spots on paper or paperboard, is markedly reduced through the use of aliphatic or alicyclic diisocyanates having an asymmetrical molecular structure. By asymmetrical molecular structure is meant the absence from the molecule of elements of symmetry (for example, mirror planes, axes of symmetry, centers of symmetry); in other words, the impossibility of performing any symmetry operation that produces a molecule congruent with the starting molecule.

Examples of suitable polyisocyanates in accordance with the invention are butane 1,4-diisocyanate, tetramethoxybutane 1,4-diisocyanate, hexane 1,6-diisocyanate, ethylene diisocyanate, 2,2,4-trimethylhexamethylene diisocyanate, ethylethylene diisocyanate, dicyclohexylmethane diisocyanate, 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanatocyclobutane, 1-isocyanatomethyl-3-isocyanato-1,5,5-trimethylcyclohexane (isophorone diisocyanate, IPDI for short), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethyl-cyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbonane diisocyanatomethyl, chlorinated, brominated, sulfur-containing or phosphorus-containing aliphatic or alicyclic diisocyanates, and also derivatives of the listed diisocyanates, more particularly dimerized or trimerized types.

In one particularly preferred embodiment isophorone diisocyanate is used.

With regard to the substantive and quantitative composition of the starting materials reacted with the diisocyanate it has surprisingly been found that combinations of at least one polypropylene glycol diol with at least one polypropylene glycol triol are suitable for producing polyurethanes having the desired profile of properties in accordance with the object of the invention, if the ratio of the number of hydroxyl groups of the diol to the number of hydroxyl groups of the triol is between 0.8 and 9.0, preferably between 1.4 and 4.0, if, additionally, the ratio of the number of isocyanate groups to the total number of hydroxyl groups is between 0.8 and 1.15, preferably between 0.95 and 1.05, if, in other words, there is neither a significant isocyanate excess nor a significant isocyanate deficit, and if the diols and triols are alternatively selected and combined in each case as follows:
  diols having a mean, number-averaged molecular weight $M_n$ of less than or equal to 1000 are combined with triols whose mean, number-averaged molecular weight $M_n$ is greater than or equal to 1000, preferably greater than or equal to 3000,
  diols having a mean, number-averaged molecular weight of greater than 1000 are combined with triols whose mean, number-averaged molecular weight is less than 1000.

As polypropylene glycols it is possible to use all commercial polyethers based on propylene oxide and a starter which is difunctional in the case of the diols and trifunctional in the case of the triols. Included here are not only the polypropylene glycols prepared conventionally—that is, generally, by using a basic catalyst, such as potassium hydroxide, for example—but also the particularly pure polypropylene glycols prepared by DMC (double metal cyanide) catalysis, whose preparation is described in, for example, U.S. Pat. No. 5,712,216 A, U.S. Pat. No. 5,693,584 A, WO 99/56874 A1, WO 99/51661 A1, WO 99/59719 A1, WO 99/64152 A1, U.S. Pat. No. 5,952,261 A, WO 99/64493 A1 and WO 99/51657 A1.

A characteristic of the DMC-catalyzed polypropylene glycols is that the "nominal" or theoretical functionality of precisely 2 in the case of the diols or precisely 3 in the case of the triols is also actually achieved approximately.

In the case of the conventionally prepared polypropylene glycols the "true" functionality is always somewhat lower than the theoretical functionality, particularly in the case of polypropylene glycols having a relatively high molecular weight. The reason for this is a secondary reaction of rearrangement of the propylene oxide to form allyl alcohol.

Furthermore, it is also possible to use all polypropylene glycol diols or triols containing copolymerized ethylene oxide, which is the case in many commercial polypropylene glycols, in order to obtain an increased reactivity towards isocyanates.

With regard to the selection of the resins it has surprisingly been found that the desired properties, especially the high transparency, but also the very good shear strength, are achieved if at least one hydrocarbon used is a monomer resin of the styrene/α-methylstyrene type having a mean, number-averaged molecular weight $M_n$ of between 200 and 6000, preferably between 500 and 2000, the weight fraction of this resin in the mixture being in one preferred embodiment greater than 0% up to a maximum of 30% and in another preferred embodiment greater than 30% up to a maximum of 55%. The weight-averaged molecular weight $M_w$ of monomer resins of the styrene or α-methylstyrene type that are suitable accordingly is between 300 and 18 000, preferably between 700 and 6000. The CAS registration number of the monomer resins of the styrene/α-methylstyrene type is 9011-11-4. They may also be referred to as polymer resins based on ethenylbenzene with (1-methylethenyl)benzene fractions.

By varying the ratio of the number of hydroxyl groups in the diol to that in the triol within the stated boundaries, and also by varying the resin fraction within the stated boundaries, it is possible to adjust the bond strength in accordance with the application. Surprisingly it has been found that the higher the ratio of the number of diol OH groups to the number of triol OH groups, the greater the bond strength within the stated boundaries, up to a point shortly before the boundary region.

The bond strength range which can be adjusted within the stated boundaries is approximately between 1.0 and 25.0 N/cm, within the preferred boundaries between approximately 1.5 and 20.0 N/cm.

In one possible embodiment the polyurethane-based PSA includes further formulating ingredients, such as, for example, catalysts, aging inhibitors (antioxidants), light stabilizers, UV absorbers, rheological additives, and other auxiliaries and additives.

When selecting these substances it should be ensured that they do not have any tendency to migrate to the substrate to be bonded, so that no spots are formed in this way. For the same reason the concentration of these substances, particularly of the liquid substances, in the composition as a whole is to be minimized. The additional use of plasticizers, though possible, should be avoided.

In order to accelerate the reaction between the isocyanate component and the component which reacts with the isocyanate it is possible to use any of the catalysts known to the person skilled in the art, such as tertiary amines or organotin compounds, for example. It is found to be particularly advantageous if the catalyst used is a compound comprising bismuth and carbon, preferably a bismuth carboxylate or a bismuth carboxylate derivative.

The use of antioxidants, though advantageous, is not mandatory.

Suitable antioxidants include, for example, sterically hindered phenols, hydroquinone derivatives, amines, organic sulfur compounds or organic phosphorus compounds.

Light stabilizers and UV absorbers can optionally also be used.

Light stabilizers used are those disclosed in Gaechter and Müller, Taschenbuch der Kunststoff-Additive, Munich 1979, in Kirk-Othmer (3rd) 23, 615 to 627, in Encycl. Polym. Sci. Technol. 14, 125 to 148 and in Ullmann (4th) 8, 21; 15, 529, 676.

Examples of rheological additives are pyrogenic silicas, phyllosilicates (bentonites), high molecular mass polyamide powders or castor oil derivative powders.

In one preferred embodiment the pressure-sensitive adhesive is prepared continuously in accordance with the process described below:

A vessel A is charged substantially with the premixed polypropylene glycol combination (polyol component) and a vessel B is charged substantially with the isocyanate component, the hydrocarbon resin or hydrocarbon resins and also, where appropriate, the further formulating ingredients having been mixed into these components beforehand in a standard mixing procedure.

The polyol component and the isocyanate component are conveyed via precision pumps through the mixing head or mixing tube of a multi-component mixing and metering unit, where they are homogeneously mixed and consequently reacted. The chemically inter-reactive components mixed in this way are applied immediately thereafter to a web-form backing material which is preferably moving at a constant speed. The nature of the backing material depends on the article to be produced. The backing material coated with the reactive, resin-containing polyurethane composition is passed through a heating tunnel, in which the resin-containing polyurethane composition cures to the pressure-sensitive adhesive. The coatweight of the polyurethane composition is freely selectable. It depends on the article to be produced. Finally the coated backing material is wound up in a winding station.

The process described allows solvent-free and water-free operation. Solvent-free and water-free operation is the preferred procedure, but is not mandatory. In order, for example, to obtain particularly low coatweights, the components can be diluted appropriately.

The PSAs of the invention are outstandingly suitable for producing self-adhesive articles such as, for example, adhesive tapes, adhesive films, adhesive strips, adhesive sheets or adhesive pads.

For the purposes of this invention the general expression "adhesive tape" encompasses all sheetlike structures such as two-dimensionally extended sheets or sheet sections, tapes with extended length and limited width, tape sections, diecuts, labels, and the like.

The PSA may be applied single-sidedly or double-sidedly to backing materials.

As a basis for the backing material, use is made of the backing materials that are typical and familiar to a person skilled in the art, such as films made of polyethylene, polypropylene, oriented polypropylene, Polyvinyl chloride, polyester and, with particular preference, polyethylene terephthalate (PET). These materials may be monofilms, coextruded films or laminated films. This enumeration is exemplary and not conclusive. The surface of the films may have been microstructured by means of suitable techniques such as embossing, etching or lasering, for example.

The backing films, or individual layers of the backing films, may also have been foamed with a gas or may have undergone a change in volume through the addition of expandable or pre-expanded microballoons, hollow glass microbeads, and solid glass microbeads.

If the polyurethane composition is to be applied to webform backing materials it is possible, in order to enhance the anchorage of the polyurethane composition on the web-form backing materials, to use all known methods of surface pretreatment, such as, for example, corona pretreatment, flaming or gas-phase treatment (fluorination, for example). It is also possible to use all known methods of primering, in which case the primer coat may be applied to the backing material either from solutions or from dispersions, or else by an extrusion or coextrusion process.

In order to improve the unwind properties of the wound roll it is possible to precoat the reverse of the webform material with a release coating material or for the reverse to carry a coextruded or extruded-on release coating.

The thickness of the adhesive pads, particularly if the adhesive pads are formed from a layer of the PSA of the invention, is typically between 50 µm to 3000 µm, preferably 100 µm to 2000 µm, more preferably 500 µm to 1500 µm.

The adhesive pads are preferably diecut in the form of geometric figures such as rectangles, squares, circles, ellipses, rhombuses, and the like. The area for the typical applications is usually 0.5 to 500 cm$^2$, preferably 0.8 to 50.0 cm$^2$, more preferably 0.9 to 5.0 cm$^2$.

PSAs of the invention exhibit outstanding product properties which even the person skilled in the art could not have foreseen in such a way.

The pressure-sensitive adhesive with a weight fraction of the resin in the mixture of greater than 0% and up to 30% is suitable for fixing, for example, notes, sheets of paper, calendar pages, strips, cards or boxes made of paperboard, cardboard material or plastic, or other small utility articles made of plastic, wood, glass, stone or metal, reliably to numerous substrates or to themselves.

The pressure-sensitive adhesive of this embodiment can be detached again without problems at any time, even after weeks or months, from the articles, materials or substrates to which it has been adhered without damage to these articles, materials or substrates. In particular the PSA is transparent. Following detachment, the pressure-sensitive adhesive does not leave behind any residues or greasy-looking spots on the bonded articles, materials or substrates, not even on highly absorbent paper.

The pressure-sensitive adhesive of this embodiment can be used more than once without impairment in its bond strength. If the PSA is stored in the unbonded state in a normal environment for a relatively long period without a protective covering, it then naturally becomes dusty, and its bond strength is thus reduced as a result. Such a layer of dust can easily be removed again at any time using normal mains water. After drying, the original bond strength is immediately reestablished in full. Even large quantities of dust, sand or powders of any grain size can easily be removed again by washing.

By virtue of the fact that the PSA is stable to light it can also be used for adhesive bonding on articles, materials or substrates which are exposed to light and the sun, for example on or behind windowpanes or car windows. In general, the PSA is equally suitable for both interior and exterior applications.

The pressure-sensitive adhesive with a weight fraction of the resin in the mixture of greater than/equal to 30% and up to 55% is suitable for bonding light- to medium-weight particles durably to themselves or other substrates even under high shearing loads.

The intention of the text below is to illustrate the invention with reference to examples, though without wishing thereby to limit it.

The following test methods were used concisely to characterize the specimens produced in accordance with the processes described.

The molecular weight determinations of the weight-average molecular weights $M_w$ and the number-averaged molecular weights $M_n$ of the hydrocarbon resins were carried out by means of gel permeation chromatography (GPC). The eluent used was THF (tetrahydrofuran) with 0.1% by volume trifluoroacetic acid. Measurement took place at 25° C. The precolumn used was PSS-SDV, 5µ, 10$^3$ Å, ID 8.0 mm×50 mm. Separation was carried out using the columns PSS-SDV, 5µ, 10$^3$ and also 10$^5$ and 10$^6$, each of ID 8.0 mm×300 mm. The sample concentration is 4 g/l and the flow rate is 1.0 ml per minute. Measurement took place against PMMA standards.

The number-averaged molecular weights $M_n$ of the polyols were determined via the determination of the hydroxyl number (end-group determination) in accordance with DIN 53240, and subsequent calculation of $M_n$ based on the respective nominal functionality of the polyols.

The test specimens were each produced by coating the initially liquid, reactive polyurethane PSA at a coatweight of 50 g/m$^2$ onto a 26 µm polyester film and curing it at 100° C. The measurements were made after an "aging period" (at room temperature) of one week.

The bond strength was determined in accordance with PSTC-101. In accordance with this method the assembly of PSA layer and polyester film is applied to the substrate (steel) and then peeled off under defined conditions by means of a tensile testing machine. The peel angle is in each case 180° and the peel rate 300 mm/min. The force required for peeling is the bond strength, which is reported in the unit N/cm.

The shear test was carried out in accordance with test specification PSTC-107. According to this method the assembly of PSA layer and polyester film is applied to the substrate (steel) and subsequently subjected to a constant shear load. The holding time is measured, in minutes.

The bond area was in each case 13×20 mm. The shear load on this bond area was in each case either 1 kg or 2 kg (specified in the individual examples).

The tack measurement (measurement of the surface stickiness) was carried out by the rolling ball method in accordance with test specification PSTC-6. The measuring apparatus is accordingly composed essentially of an inclined plane, a steel ball and a defined stainless steel substrate. The 5.6 g steel ball (11 mm in diameter) rolls down the inclined plane (height: 65 mm) at an angle of inclination of 21.5° onto the PSA, which brakes the ball by virtue of its pressure-sensitive adhesiveness. The distance run by the ball on the PSA surface is taken as a measure of the tack. Accordingly, the tack is inversely proportional to the distance traveled.

The testing of light stability was carried out using a "sunlight lamp" from Osram with the designation ULTRA-VITALUX®, power input 300 W. The samples were uninterruptedly irradiated, unprotected, from a distance of 50 cm. The temperature at the location of the sample was in each case approximately 60° C. Assessments were made of the color change of the PSA and also of the change in bond strength, in each case after a period of irradiation of one week. This corresponds approximately in each case to 5-fold uninterrupted real summer sun exposure in central Europe.

EXAMPLES

Coating in the examples was carried out on a standard laboratory coating unit for continuous coating. The sheet width was 50 cm. The coating slot width was variably adjustable between 0 and 1 cm. The length of the heating tunnel was about 12 m. The temperature in the heating tunnel was divisible into four zones each freely selectable between room temperature and 120° C.

A standard multi-component mixing and metering unit with a dynamic mixing system was used. The mixing head was designed for two liquid components. The mixing rotor had a variable speed of up to approximately 5000 rpm max. The metering pumps of this unit were gear pumps having an output of approximately 2 l/min max.

The A components were prepared in a standard heatable and evaluable mixing tank. During the mixing operation, which took about two hours in each case, the temperature of the mixture was set at about 70° C. to 100° C. and a vacuum was applied in order to degas the components.

Table 1 lists the base materials used to prepare PSAs, in each case with their trade names and manufacturers. The raw materials cited are all freely available commercially.

TABLE 1

Base materials used to prepare the polyurethane PSAs

| Tradename | Chemical basis | Mean, number-averaged molecular weight $M_n$ | OH or NCO number (mmol OH/kg or mmol NCO/kg) | Manufacturer/supplier |
|---|---|---|---|---|
| Voranol P 400 ® | polypropylene glycol, diol | 400 | 4643 | Dow |
| Desmophen 1112 BD ® | polypropylene glycol, diol | 1000 | 1977 | Bayer |
| Acclaim 4220 N ® | polypropylene glycol, diol, high-purity, prepared by DMC catalysis | 4000 | 500 | Bayer |
| Desmophen 1380 BT ® | polypropylene glycol, triol | 450 | 6774 | Bayer |
| Voranol CP 4755 ® | polypropylene glycol, triol | 4700 | 615 | Dow |
| Voranol CP 6055 ® | polypropylene glycol, triol | 6000 | 490 | Dow |
| Vestanat IPDI ® | isophorone diisocyanate | | 8998 | Degussa |
| Desmodur W ® | Dicyclohexyl-methane diisocyanate | | 7571 | Bayer |
| Kristalex F 85 ® | monomer resin of styrene/α-methyl-styrene type | 750 | | Eastman |
| Kristalex F 100 ® | monomer resin of styrene/α-methyl-styrene type | 800 | | Eastman |
| Piccotac 1100 E ® | aliphatic hydrocarbon resin | 950 | | Eastman |
| Regalite R 1100 ® | fully hydrogenated hydrocarbon resin | 600 | | Eastman |
| Tinuvin 292 ® | sterically hindered amine, light stabilizer and aging inhibitor | | | Ciba |
| Tinuvin 400 ® | triazine derivative, UV stabilizer bismuth trisneodecanoate CAS No. 34364-26-6 | | | Ciba |
| Mark DBTL ® | dibutyltin dilaurate | | | Nordmann, Rassmann |

Example 1

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 14.9 | 69.35 mmol OH |
|  | Voranol CP 6055 ® | 60.7 | 29.72 mmol OH |
|  | Kristalex F85 ® | 10.0 |  |
|  | Bismuth trisneodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 11.0 | 99.07 mmol NCO |

The test specimens (50 g/m² polyurethane PSA on 26 µm polyester film; see above) achieved a bond strength on steel of 2.9 N/cm. In the shear test a holding time of greater than 10 000 minutes was achieved under a 1 kg shearing load. The distance run by the ball in the Rolling Ball Test was 28 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 2

The composition of the inventive polyurethane PSA is as follows:
NCO/OH ratio: 1.0
Ratio of number of diol-OH/number of triol-OH: 1.0

|  | Ingredient | Weight fraction [% by weight] | Number of OH or NCO groups, based on the percentage weight fraction |
|---|---|---|---|
| A component | Voranol P 400 ® | 7.5 | 34.94 mmol OH |
|  | Voranol CP 6055 ® | 71.3 | 34.94 mmol OH |
|  | Kristalex F85 ® | 10.0 |  |
|  | Bismuth trisneodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 7.8 | 69.88 mmol NCO |

The test specimens (50 g/m² polyurethane PSA on 26 µm polyester film; see above) achieved a bond strength on steel of 1.3 N/cm. In the shear test a holding time of 8520 minutes was achieved under a 1 kg shearing load. The distance run by the ball in the Rolling Ball Test was 62 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 3

The composition of the inventive polyurethane PSA is as follows:
NCO/OH ratio: 1.0
Ratio of number of diol-OH/number of triol-OH: 4.0

|  | Ingredient | Weight fraction [% by weight] | Number of OH or NCO groups, based on the percentage weight fraction |
|---|---|---|---|
| A component | Voranol P 400 ® | 21.6 | 100.17 mmol OH |
|  | Voranol CP 6055 ® | 51.1 | 25.04 mmol OH |
|  | Kristalex F85 ® | 10.0 |  |
|  | Bismuth trisneodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 13.9 | 125.22 mmol NCO |

The test specimens (50 g/m² polyurethane PSA on 26 µm polyester film; see above) achieved a bond strength on steel of 4.5 N/cm. In the shear test a holding time of 4500 minutes was achieved under a 1 kg shearing load. The distance run by the ball in the Rolling Ball Test was 13 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 4

The composition of the inventive polyurethane PSA is as follows:
NCO/OH ratio: 1.0
Ratio of number of diol-OH/number of triol-OH: 2.33

| | Ingredient | Weight fraction [% by weight] | Number of OH or NCO groups, based on the percentage weight fraction |
|---|---|---|---|
| A component | Voranol P 400 ® | 13.2 | 61.34 mmol OH |
| | Voranol CP 6055 ® | 53.7 | 26.29 mmol OH |
| | Kristalex F85 ® | 20.0 | |
| | Bismuth trisneodecanoate | 0.5 | |
| | Tinuvin 292 ® | 0.3 | |
| | Tinuvin 400 ® | 0.6 | |
| | Aerosil R202 ® | 2.0 | |
| B component | Vestanat IPDI ® | 9.7 | 87.63 mmol NCO |

The test specimens (50 g/m² polyurethane PSA on 26 μm polyester film; see above) achieved a bond strength on steel of 4.7 N/cm. In the shear test a holding time of greater than 10 000 minutes was achieved under a 1 kg shearing load. The distance run by the ball in the Rolling Ball Test was 15 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 5

The composition of the inventive polyurethane PSA is as follows:
NCO/OH ratio: 1.0
Ratio of number of diol-OH/number of triol-OH: 2.33

| | Ingredient | Weight fraction [% by weight] | Number of OH or NCO groups, based on the percentage weight fraction |
|---|---|---|---|
| A component | Voranol P 400 ® | 12.4 | 57.34 mmol OH |
| | Voranol CP 6055 ® | 50.1 | 24.57 mmol OH |
| | Kristalex F85 ® | 25.0 | |
| | Bismuth trisneodecanoate | 0.5 | |
| | Tinuvin 292 ® | 0.3 | |
| | Tinuvin 400 ® | 0.6 | |
| | Aerosil R202 ® | 2.0 | |
| B component | Vestanat IPDI ® | 9.1 | 81.91 mmol NCO |

The test specimens (50 g/m² polyurethane PSA on 26 μm polyester film; see above) achieved a bond strength on steel of 5.3 N/cm. In the shear test a holding time of greater than 10 000 minutes was achieved under a 1 kg shearing load. The distance run by the ball in the Rolling Ball Test was 8 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 6

The composition of the inventive polyurethane PSA is as follows:
NCO/OH ratio: 1.0
Ratio of number of diol-OH/number of triol-OH: 2.33

| | Ingredient | Weight fraction [% by weight] | Number of OH or NCO groups, based on the percentage weight fraction |
|---|---|---|---|
| A component | Voranol P 400 ® | 12.9 | 59.90 mmol OH |
| | Voranol CP 6055 ® | 52.4 | 25.67 mmol OH |
| | Kristalex F85 ® | 20.0 | |
| | Bismuth trisneodecanoate | 0.5 | |
| | Tinuvin 292 ® | 0.3 | |
| | Tinuvin 400 ® | 0.6 | |
| | Aerosil R202 ® | 2.0 | |
| B component | Desmodur W ® | 11.3 | 85.58 mmol NCO |

The test specimens (50 g/m² polyurethane PSA on 26 μm polyester film; see above) achieved a bond strength on steel of 4.5 N/cm. In the shear test a holding time of greater than 10 000 minutes was achieved under a 1 kg shearing load. The distance run by the ball in the Rolling Ball Test was 22 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 7

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 13.2 | 61.34 mmol OH |
|  | Voranol CP 6055 ® | 53.7 | 26.29 mmol OH |
|  | Kristalex F85 ® | 20.0 |  |
|  | Mark DBTL ® | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 9.7 | 87.63 mmol NCO |

The test specimens (50 g/m$^2$ polyurethane PSA on 26 µm polyester film; see above) achieved a bond strength on steel of 7.2 N/cm. In the shear test a holding time of 860 minutes was achieved under a 1 kg shearing load. The distance run by the ball in the Rolling Ball Test was 9 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from some of the stated substrates after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 8

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 14.9 | 69.35 mmol OH |
|  | Voranol CP 6055 ® | 60.7 | 29.72 mmol OH |
|  | Kristalex F100 ® | 10.0 |  |
|  | Bismuth tris-neodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 11.0 | 99.07 mmol NCO |

The test specimens (50 g/m$^2$ polyurethane PSA on 26 µm polyester film; see above) achieved a bond strength on steel of 2.5 N/cm. In the shear test a holding time of greater than 10 000 minutes was achieved under a 1 kg shearing load. The distance run by the ball in the Rolling Ball Test was 25 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made, on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 9

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 13.2 | 61.34 mmol OH |
|  | Voranol CP 6055 ® | 53.7 | 26.29 mmol OH |
|  | Kristalex F100 ® | 20.0 |  |
|  | Bismuth tris-neodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 9.7 | 87.63 mmol NCO |

The test specimens (50 g/m² polyurethane PSA on 26 μm polyester film; see above) achieved a bond strength on steel of 4.1 N/cm. In the shear test a holding time of greater than 10 000 minutes was achieved under a 1 kg shearing load. The distance run by the ball in the Rolling Ball Test was 31 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 10

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 13.2 | 61.34 mmol OH |
|  | Voranol CP 6055 ® | 53.7 | 26.29 mmol OH |
|  | Kristalex F85 ® | 10.0 |  |
|  | Kristalex F100 ® | 10.0 |  |
|  | Bismuth tris-neodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 9.7 | 87.63 mmol NCO |

The test specimens (50 g/m² polyurethane PSA on 26 μm polyester film; see above) achieved a bond strength on steel of 5.1 N/cm. In the shear test a holding time of greater than 10 000 minutes was achieved under a 1 kg shearing load. The distance run by the ball in the Rolling Ball Test was 20 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 11

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 10.6 | 49.33 mmol OH |
|  | Voranol CP 6055 ® | 43.2 | 21.14 mmol OH |
|  | Kristalex F85 ® | 35.0 |  |
|  | Bismuth tris-neodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 7.8 | 70.47 mmol NCO |

The test specimens (50 g/m² polyurethane PSA on 26 μm polyester film; see above) achieved a bond strength on steel of 4.9 N/cm. In the shear test a holding time of greater than 10 000 minutes was achieved under a 1 kg shearing load and a holding time of greater than 5800 minutes was achieved under a 2 kg shearing load. The distance run by the ball in the Rolling Ball Test was 21 mm. After one week of irradiation with the sunlight lamp there were no changes, either in color or in bond strength. The PSA was washable. For testing it was sprinkled with fine-grained sand and, in a second test, with fine-grained talc. Both substances were easily removable again under running water. The bond strength was subsequently at the original level again.

Example 12

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 9.4 | 43.72 mmol OH |
|  | Voranol CP 6055 ® | 38.3 | 18.74 mmol OH |
|  | Kristalex F85 ® | 42.0 |  |
|  | Bismuth tris-neodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 6.9 | 62.46 mmol NCO |

The test specimens (50 g/m² polyurethane PSA on 26 μm polyester film; see above) achieved a bond strength on steel of 4.6 N/cm. In the shear test a holding time of greater than 10 000 minutes was achieved both under a 1 kg shearing load and under a 2 kg shearing load. The distance run by the ball in the Rolling Ball Test was 33 mm. After one week of irradiation with the sunlight lamp there were no changes, either in color or in bond strength. The PSA was washable. For testing it was sprinkled with fine-grained sand and, in a second test, with fine-grained talc. Both substances were easily removable again under running water. The bond strength was subsequently at the original level again.

Example 13

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 9.2 | 42.70 mmol OH |
|  | Voranol CP 6055 ® | 37.3 | 18.30 mmol OH |
|  | Kristalex F85 ® | 42.0 |  |
|  | Bismuth tris-neodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Desmodur W ® | 8.1 | 61.00 mmol NCO |

The test specimens (50 g/m² polyurethane PSA on 26 μm polyester film; see above) achieved a bond strength on steel of 4.1 N/cm. In the shear test a holding time of greater than 10 000 minutes was achieved both under a 1 kg shearing load and under a 2 kg shearing load. The distance run by the ball in the Rolling Ball Test was 19 mm. After one week of irradiation with the sunlight lamp there were no changes, either in color or in bond strength. The PSA was washable. For testing it was sprinkled with fine-grained sand and, in a second test, with fine-grained talc. Both substances were easily removable again under running water. The bond strength was subsequently at the original level again.

Example 14

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 15.4 | 71.52 mmol OH |
|  | Voranol CP 4755 ® | 49.8 | 30.65 mmol OH |
|  | Kristalex F85 ® | 20.0 |  |
|  | Bismuth tris-neodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 11.4 | 102.17 mmol NCO |

The test specimens (50 g/m² polyurethane PSA on 26 μm polyester film; see above) achieved a bond strength on steel of 3.8 N/cm. In the shear test a holding time of greater than 10 000 minutes was achieved under a 1 kg shearing load. The distance run by the ball in the Rolling Ball Test was 35 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even, after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 15

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
|---|---|---|---|
| A component | Voranol P 400 ® | 15.4 | 71.52 mmol OH |
|  | Voranol CP 4755 ® | 49.8 | 30.65 mmol OH |
|  | Kristalex F85 ® | 20.0 |  |
|  | Mark DBTL ® | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 11.4 | 102.17 mmol NCO |

The test specimens (50 g/m² polyurethane PSA on 26 μm polyester film; see above) achieved a bond strength on steel of 6.9 N/cm. In the shear test a holding time of 1100 minutes was achieved under a 1 kg shearing load. The distance run by the ball in the Rolling Ball Test was 19 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 16

The composition of the inventive polyurethane PSA is as follows:
NCO/OH ratio: 1.0
Ratio of number of diol-OH/number of triol-OH: 4.0

|  | Ingredient | Weight fraction [% by weight] | Number of OH or NCO groups, based on the percentage weight fraction |
|---|---|---|---|
| A component | Voranol P 400 ® | 21.7 | 100.68 mmol OH |
|  | Voranol CP 4755 ® | 40.9 | 25.17 mmol OH |
|  | Kristalex F85 ® | 20.0 |  |
|  | Bismuth trisneodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 14.0 | 125.85 mmol NCO |

The test specimens (50 g/m² polyurethane PSA on 26 μm polyester film; see above) achieved a bond strength on steel of 4.5 N/cm. In the shear test a holding time of 3900 minutes was achieved under a 1 kg shearing load. The distance run by the ball in the Rolling Ball Test was 24 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 17

The composition of the inventive polyurethane PSA is as follows:
NCO/OH ratio: 1.0
Ratio of number of diol-OH/number of triol-OH: 1.0

|  | Ingredient | Weight fraction [% by weight] | Number of OH or NCO groups, based on the percentage weight fraction |
|---|---|---|---|
| A component | Desmophen 1112 BD ® | 15.8 | 31.28 mmol OH |
|  | Voranol CP 6055 ® | 63.8 | 31.28 mmol OH |
|  | Kristalex F85 ® | 10.0 |  |
|  | Bismuth trisneodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 7.0 | 62.55 mmol NCO |

The test specimens (50 g/m² polyurethane PSA on 26 μm polyester film; see above) achieved a bond strength on steel of 2.5 N/cm. In the shear test a holding time of 3800 minutes was achieved under a 1 kg shearing load. The distance run by the ball in the Rolling Ball Test was 25 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 18

The composition of the inventive polyurethane PSA is as follows:
NCO/OH ratio: 1.0
Ratio of number of diol-OH/number of triol-OH: 1.5

|  | Ingredient | Weight fraction [% by weight] | Number of OH or NCO groups, based on the percentage weight fraction |
|---|---|---|---|
| A component | Desmophen 1112 BD ® | 23.3 | 45.97 mmol OH |
|  | Voranol CP 4755 ® | 49.8 | 30.65 mmol OH |
|  | Kristalex F85 ® | 15.0 |  |
|  | Bismuth trisneodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 8.5 | 76.62 mmol NCO |

The test specimens (50 g/m² polyurethane PSA on 26 μm polyester film; see above) achieved a bond strength on steel of 3.1 N/cm. In the shear test a holding time of 6900 minutes was achieved under a 1 kg shearing load. The distance run by the ball in the Rolling Ball Test was 34 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 19

The composition of the inventive polyurethane PSA is as follows:
NCO/OH ratio: 1.0
Ratio of number of diol-OH/number of triol-OH: 5.66

|  | Ingredient | Weight fraction [% by weight] | Number of OH or NCO groups, based on the percentage weight fraction |
| --- | --- | --- | --- |
| A component | Desmophen 1380 BT ® | 20.3 | 137.17 mmol OH |
|  | Acclaim 4220 N ® | 48.4 | 24.21 mmol OH |
|  | Kristalex F85 ® | 10.0 |  |
|  | Bismuth trisneodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 17.9 | 161.38 mmol NCO |

The test specimens (50 g/m$^2$ polyurethane PSA on 26 μm polyester film; see above) achieved a bond strength on steel of 6.8 N/cm. In the shear test a holding time of 890 minutes was achieved under a 1 kg shearing load. The distance run by the ball in the Rolling Ball Test was 8 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 20

The composition of the inventive polyurethane PSA is as follows:
NCO/OH ratio: 1.0
Ratio of number of diol-OH/number of triol-OH: 2.33

|  | Ingredient | Weight fraction [% by weight] | Number of OH or NCO groups, based on the percentage weight fraction |
| --- | --- | --- | --- |
| A component |  | 14.9 | 69.35 mmol OH |
|  |  | 60.7 | 29.72 mmol OH |
|  | Kristalex F85 ® | 10.0 |  |
|  | Bismuth trisneodecanoate | 0.5 |  |
|  | Tinuvin 292 ® | 0.3 |  |
|  | Tinuvin 400 ® | 0.6 |  |
|  | Aerosil R202 ® | 2.0 |  |
| B component | Vestanat IPDI ® | 11.0 | 99.07 mmol NCO |

The test specimens (50 g/m$^2$ polyurethane PSA on 26 μm polyester film; see above) achieved a bond strength on steel of 4.5 N/cm. In the shear test a holding time of 10 000 minutes was achieved under a 1 kg shearing load. The distance run by the ball in the Rolling Ball Test was 28 mm. The PSA was assessed visually as being of glass-clear transparency. After one week of irradiation with the sunlight lamp there were no changes, either in color or in bond strength. The PSA allowed various types of paper (normal writing paper, copier paper, newsprint, and magazine paper) and paperboard to be reliably bonded. The PSA was in each case removable again from the stated substrates without problems even after a bonding time of six months, without leaving behind residues or greasy-looking spots and without damaging the substrates. This was the case even when the bonds were made on windowpanes and the PSA was subject to normal sunlight irradiation. The PSA was also washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

COMPARATIVE EXAMPLES

Comparative Example 1

The composition of the PSA is as follows:
NCO/OH ratio: 1.0
Ratio of number of diol-OH/number of triol-OH: 1.0

|  | Ingredient | Weight fraction [% by weight] | Number of OH or NCO groups, based on the percentage weight fraction |
| --- | --- | --- | --- |
| A component | Voranol P 400 ® | 7.5 | 34.94 mmol OH |
|  | Voranol CP 6055 ® | 71.3 | 34.94 mmol OH |
|  | Piccotac 1100 E | 10.0 |  |
|  | Bismuth trisneodecanoate | 0.5 |  |

-continued

| | Ingredient | Weight fraction [% by weight] | Number of OH or NCO groups, based on the percentage weight fraction |
|---|---|---|---|
| | Tinuvin 292 ® | 0.3 | |
| | Tinuvin 400 ® | 0.6 | |
| | Aerosil R202 ® | 2.0 | |
| B component | Vestanat IPDI ® | 7.8 | 69.88 mmol NCO |

The test specimens (50 g/m² PSA on 26 µm polyester film; see above) achieved a bond strength on steel of 0.3 N/cm. In the shear test a holding time of only 120 minutes under a 1 kg shearing load was achieved. The PSA was not transparent.

Comparative Example 2

The composition of the PSA is as follows:
NCO/OH ratio: 1.0
Ratio of number of diol-OH/number of triol-OH: 1.0

| | Ingredient | Weight fraction [% by weight] | Number of OH or NCO groups, based on the percentage weight fraction |
|---|---|---|---|
| A component | Voranol P 400 ® | 7.5 | 34.94 mmol OH |
| | Voranol CP 6055 ® | 71.3 | 34.94 mmol OH |
| | Regalite R 1100 | 10.0 | |
| | Bismuth trisneodecanoate | 0.5 | |
| | Tinuvin 292 ® | 0.3 | |
| | Tinuvin 400 ® | 0.6 | |
| | Aerosil R202 ® | 2.0 | |
| B component | Vestanat IPDI ® | 7.8 | 69.88 mmol NCO |

The test specimens (50 g/m² PSA on 26 µm polyester film; see above) achieved a bond strength on steel of 0.1 N/cm. In the shear test a holding time of only 28 minutes under a 1 kg shearing load was achieved. The PSA was not transparent.

Comparative Example 3

The composition of the PSA is as follows:
NCO/OH ratio: 1.0
Ratio of number of diol-OH/number of triol-OH: 15.0

| | Ingredient | Weight fraction [% by weight] | Number of OH or NCO groups, based on the percentage weight fraction |
|---|---|---|---|
| A component | Voranol P 400 ® | 39.7 | 184.26 mmol OH |
| | Voranol CP 6055 ® | 25.1 | 12.28 mmol OH |
| | Kristalex F85 ® | 10.0 | |
| | Bismuth trisneodecanoate | 0.5 | |
| | Tinuvin 292 ® | 0.3 | |
| | Tinuvin 400 ® | 0.6 | |
| | Aerosil R202 ® | 2.0 | |
| B component | Vestanat IPDI ® | 21.8 | 196.55 mmol NCO |

The test specimens (50 g/m² PSA on 26 µm polyester film; see above) achieved a bond strength on steel of 0.01 N/cm. In the shear test a holding time of <1 minute under a 1 kg shearing load was achieved. With the PSA is was not possible to bond paper reliably.

We claim:

1. A pressure-sensitive adhesive comprising a mixture of a chemically crosslinked polyurethane and at least one hydrocarbon resin, the chemically crosslinked polyurethane being composed of the following starting materials which in the stated proportions are reacted with one another catalytically in the presence of the at least one hydrocarbon resin:
    a) at least one aliphatic or alicyclic polyisocyanate whose functionality is less than or equal to three,
    b) a combination of at least one polypropylene ether diol and one polypropylene ether triol, the ratio of the number of isocyanate groups to the total number of hydroxyl groups being between 0.8 and 1.15, and the ratio of the number of hydroxyl groups in the diol component to the number of hydroxyl groups in the triol component being between 0.8 and 9.0, and the diols and triols alternatively being selected and combined as follows:
        diols having a mean, number-averaged molecular weight $M_n$ of less than or equal to 1000 are combined with triols whose mean, number-averaged molecular weight $M_n$ is greater than or equal to 1000,
        diols having a mean, number-averaged molecular weight of greater than 1000 are combined with triols whose mean, number-averaged molecular weight is less than 1000,
wherein at least one hydrocarbon resin is a styrene/α-methylstyrene resin having a mean, number-averaged molecular weight $M_n$ of between 200 and 6000, the weight fraction of the resin in the mixture being greater than 0% and ranging up to a maximum of 55%.

2. The pressure-sensitive adhesive of claim 1, wherein the weight fraction of the at least one hydrocarbon resin in the mixture is greater than 0% and ranges up to 30%.

3. The pressure-sensitive adhesive of claim 1, wherein the weight fraction of the at least one hydrocarbon resin in the mixture is greater than or equal to 30% and ranges up to a maximum of 55%.

4. The pressure-sensitive adhesive of claim 1, wherein the catalyst for the reaction to give polyurethane is or comprises a compound comprising bismuth and carbon.

5. The pressure-sensitive adhesive of claim 1, wherein the polyisocyanate is an aliphatic or alicyclic diisocyanate having an asymmetrical molecular structure.

6. The pressure-sensitive adhesive of claim 1, wherein the polyisocyanate is selected from the group consisting of butane 1,4-diisocyanate, tetramethoxybutane 1,4-diisocyanate, hexane 1,6-diisocyanate, ethylene diisocyanate, 2,2,4-trimethylhexamethylene diisocyanate, ethylethylene diisocyanate, dicyclohexylmethane diisocyanate, 1,4-diisocyanatocyclohexane, 1,3-diisocyanatocyclohexane, 1,2-diisocyanatocyclohexane, 1,3-diisocyanatocyclopentane, 1,2-diisocyanatocyclopentane, 1,2-diisocyanatocyclobutane, 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclo-hexane, norbonane diisocyanatomethyl, chlorinated, brominated, sulfur-containing or phosphorus-containing aliphatic or alicyclic diisocyanates, and the dimerized and trimerized derivatives of said diisocyanates.

7. The pressure-sensitive adhesive of claim 1, wherein the weight-averaged molecular weight $M_w$ of the styrene/α-methylstyrene resin is between 300 and 18 000.

8. The pressure-sensitive adhesive of claim 1, further comprising formulating ingredients selected from the group consisting of catalysts, aging inhibitors, light stabilizers, UV absorbers and rheological additives.

9. Process for preparing the pressure-sensitive adhesive of claim 1, comprising
   a) charging a vessel A with a polyol component comprising a mixture of said polypropylene ether diol and polypropylene ether triol and charging a vessel B an isocyanate component comprising said at least one aliphatic or alicyclic polyisocyanate, the hydrocarbon resin or hydrocarbon resins and, optionally, the further formulating ingredients being mixed into these components beforehand in a standard mixing procedure, and the components optionally comprising organic solvents or water,
   b) conveying the polyol component and the isocyanate component via precision pumps through the mixing head or mixing tube of a multi-component mixing and metering unit, where they are homogeneously mixed and consequently reacted,
   c) applying the chemically inter-reactive components mixed in this way immediately thereafter as a coating to a web-form backing material which is optionally moving at a constant speed,
   d) passing the coated backing material through a heating tunnel in which the coating cures to a pressure-sensitive polyurethane adhesive,
   e) finally, winding the coated backing material up in a winding station.

10. Process of claim 9, wherein the preparation takes place without solvent and/or without addition of water.

11. A method for producing self-adhesive articles which comprises applying the pressure sensitive adhesive of claim 1 to an article to be made pressure sensitive.

12. A method for fixing notes, sheets of paper, calendar pages, strips, cards or boxes made of paperboard, cardboard material or plastic, or small utility articles made of plastic, wood, glass, stone or metal which comprises fixing same with the pressure-sensitive adhesive of claim 1.

13. The pressure-sensitive adhesive sheet of claim 6, wherein said polyisocyanate is 1-isocyanatomethyl-3-isocyanato-1,5,5-trimethyl-cyclohexane.

* * * * *